UNITED STATES PATENT OFFICE.

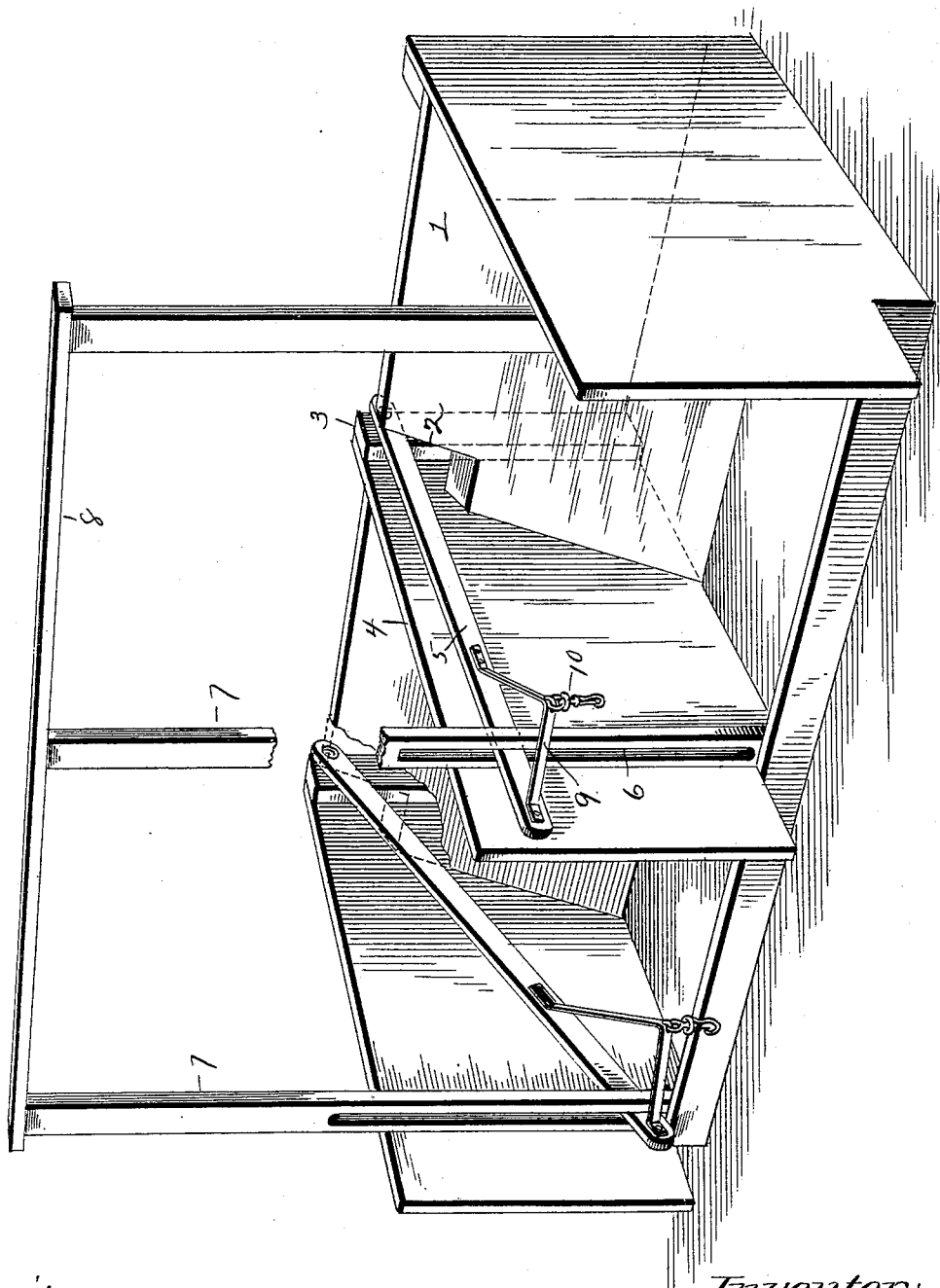

WILLARD H. KNAPP, OF CORTLAND, NEW YORK, ASSIGNOR OF ONE-HALF TO JESSE O. SPRAGUE, OF SYRACUSE, NEW YORK.

DEVICE FOR HITCHING COWS.

SPECIFICATION forming part of Letters Patent No. 618,038, dated January 17, 1899.

Application filed January 27, 1898. Serial No. 668,109. (No model.)

*To all whom it may concern:*

Be it known that I, WILLARD H. KNAPP, a citizen of the United States, residing at Cortland, in the county of Cortland and State of New York, have invented certain new and useful Improvements in Devices for Hitching Cows; and I do hereby declare the following to be a full, clear, and exact description of the invention, such as will enable others skilled in the art to which it appertains to make and use the same.

My invention has relation to devices for hitching cows in stables; and it consists in the novel construction and arrangement of its parts, as hereinafter described.

The object of the invention is to provide a movable arm, said arm being pivoted at its rear end to one of the uprights forming the framework of the trough or manger, the said arm at its forward end passing through an elongated opening in one of the forward uprights of the manger. Thus the said upright forms a guide for the forward end of the arm. The arm is provided at its forward end with an angle-iron which is secured at its ends to the movable arm on opposite sides of the forward upright of the manger, thus forming a loop about the said upright. The angle-iron is provided with a swiveled snap-hook which is adapted to engage a suitable ring located on the collar which passes around the neck of the cow.

In the accompanying drawing the figure is a perspective view, with parts broken away, of the device.

The manger is provided at its back with the inclined side 1, the said side having one of its corners cut away and forming a recess 2. The uprights 3 are suitably secured at their lower ends, and the side partitions 4 are attached at their rear ends to the side of the uprights 3. The arm 5 is pivoted at its rear end to the upright 3, and the forward end of said arm passes through the elongated opening 6 in the forward upright 7. The uprights 7 extend well above the manger, and the upper ends of said uprights are connected to each other by the rafter 8. The lower ends of the said uprights 7 are suitably secured to the floor, or they may be embedded in the ground. The forward ends of the partitions 4 project some distance beyond the forward edge of the manger and the uprights 7, and thus the cows in adjacent stalls cannot interfere with each other or poke each other. The substantially V-shaped angle-iron 9 is attached at its ends to the forward end of the pivoted arm 5, the said angle-iron 9 embracing the upright 7, and thus forming a loop about the same. The apex of the iron 9 is located in toward the center of the manger, and the said iron at its apex is provided with a swiveled snap-hook 10, the said hook 10 being adapted to engage a ring on the halter of the cow, the swivel permitting the cow to turn her head without twisting the strap about the neck. When the cow is standing, the pivoted arm 5 is in the elevated position, as shown in the right-hand manger of the drawing, and when the arm is in the elevated position the cow is forced back. When the cow is lying down the arm 5 is in the position as shown in the left-hand manger, and thus the cow is brought forward. The arm is also in its lowered position when the cow is eating from the trough or manger, and thus when the cow is eating or when lying down she is brought forward. Thus the cow is kept clean. The angle-iron secures the cow at such a distance from the upright 7 as to give her additional freedom to turn her head either way and at the same time prevent her from interfering with her adjacent neighbor.

Having thus described my invention, what I claim as new, and desire to secure by Letters Patent, is—

1. A device for hitching animals consisting of an arm pivoted at its rear end to a stationary point at the rear of the manger, an upright located at the front of the manger having an elongated opening, said upright being suitably secured, the forward end of said arm passing through the opening of said upright, an extension located on said arm and extending toward the center of the manger and a means for connecting the halter of the animal with said extension.

2. A device for hitching animals consisting of an arm pivoted at its rear end to a stationary point, an upright having an elongated opening, said upright being suitably secured, the end of said arm passing through said opening, an angular extension secured to the forward end of the pivoted arm, the ends of said extension being located on opposite sides of the upright, and a means for connecting the halter of the animal with said extension.

3. A device for hitching animals consisting of a manger, the rear side of the manger having a recess cut in the upper portion thereof, a swinging arm passing through said recess and pivoted at its rear end to a stationary point, a suitable guide for the forward end of said arm and a means for connecting the halter of the animal with the forward end of the arm.

4. A device for hitching animals consisting of a manger, an upright located at the back of said manger, a side partition secured at its end to said upright, a swinging arm pivoted at its rear end to said upright, an upright located at the forward part of the manger, the last said upright having an elongated opening, the forward end of the pivoted arm passing through said opening, the forward portion of the side partition being attached to the last said upright, and a means for connecting the halter of the animal with the free end of the swinging arm.

In testimony whereof I affix my signature in presence of two witnesses.

WILLARD H. KNAPP.

Witnesses:
J. C. STEVENS,
BERTHA L. BRIDLEBOUGH.